(12) United States Patent
Rhodes et al.

(10) Patent No.: US 10,114,679 B2
(45) Date of Patent: Oct. 30, 2018

(54) LOGICAL CPU DIVISION USAGE HEAT MAP REPRESENTATION

(75) Inventors: Christina L. Rhodes, Kirkland, WA (US); Peter Seraphim Ponomarev, Seattle, WA (US); Matthew P. Duignan, Seattle, WA (US); Phillip Daniel Donate, Seattle, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 547 days.

(21) Appl. No.: 13/345,482

(22) Filed: Jan. 6, 2012

(65) Prior Publication Data

US 2013/0111386 A1    May 2, 2013

Related U.S. Application Data

(60) Provisional application No. 61/551,886, filed on Oct. 26, 2011.

(51) Int. Cl.
*G06F 9/50* (2006.01)
*G06F 3/0481* (2013.01)

(52) U.S. Cl.
CPC .......... *G06F 9/5077* (2013.01); *G06F 3/0481* (2013.01)

(58) Field of Classification Search
CPC ................ G06F 9/5077; G06F 11/30–11/3495
USPC ........................................................ 715/771
See application file for complete search history.

(56) References Cited

U.S. PATENT DOCUMENTS

| 5,636,376 A | 6/1997 | Chang |
| 6,148,335 A | 11/2000 | Haggard et al. |
| 6,850,257 B1 | 2/2005 | Colleran et al. |
| 6,954,934 B2 | 10/2005 | Kumar |
| 7,032,186 B1 | 4/2006 | Gasser et al. |
| 7,549,087 B2 | 6/2009 | Cummins et al. |
| 7,555,719 B1 | 6/2009 | Yehuda et al. |
| 7,693,983 B1 | 4/2010 | Gupta et al. |
| 7,827,476 B1 | 11/2010 | Roberts et al. |
| 8,429,630 B2 | 4/2013 | Nickolov et al. |
| 8,756,441 B1 | 6/2014 | Mullins et al. |

(Continued)

FOREIGN PATENT DOCUMENTS

| CN | 1541373 A | 10/2004 |
| CN | 101354317 A | 1/2009 |
| CN | 101981529 A | 2/2011 |

OTHER PUBLICATIONS

Dictionary.com definition of "Device", retrieved Apr. 10, 2015.*

(Continued)

*Primary Examiner* — Renee D Chavez
*Assistant Examiner* — Patrick R Ramsey
(74) *Attorney, Agent, or Firm* — David Chin; Chin IP, PLLC (57) ABSTRACT

A logical central processing unit (CPU) division management view is displayed for a device having multiple logical CPU divisions. The management view is displayed as a heat map representation that includes multiple cells, each of which corresponds to one of the multiple logical CPU divisions. As part of the heat map representation, each of the multiple cells is displayed in one of multiple different manners based on a usage of the corresponding logical CPU division, and a usage value identifying usage of the corresponding one of the multiple logical processors can also displayed in the cell.

20 Claims, 8 Drawing Sheets

(56) References Cited

U.S. PATENT DOCUMENTS

| | | | |
|---|---|---|---|
| 8,863,022 | B2 | 10/2014 | Rhodes et al. |
| 2003/0006988 | A1 | 1/2003 | Alford, Jr. |
| 2003/0236811 | A1 | 12/2003 | Green et al. |
| 2004/0267897 | A1 | 12/2004 | Hill et al. |
| 2005/0010660 | A1 | 1/2005 | Vaught |
| 2005/0028158 | A1 | 2/2005 | Ferguson et al. |
| 2005/0060663 | A1 | 3/2005 | Arkeketa et al. |
| 2005/0104799 | A1* | 5/2005 | Shimizu ............. G06F 11/3404 345/1.2 |
| 2006/0230321 | A1 | 10/2006 | Cummins et al. |
| 2006/0230324 | A1 | 10/2006 | Cummins et al. |
| 2006/0277206 | A1* | 12/2006 | Bailey .................. G06F 11/328 |
| 2007/0185909 | A1 | 8/2007 | Klein et al. |
| 2008/0109753 | A1 | 5/2008 | Karstens |
| 2008/0115131 | A1 | 5/2008 | Kelsey et al. |
| 2008/0163125 | A1 | 7/2008 | Gu et al. |
| 2008/0196043 | A1* | 8/2008 | Feinleib et al. ............. 719/319 |
| 2008/0220375 | A1 | 9/2008 | Kim et al. |
| 2008/0222437 | A1 | 9/2008 | Sutardja et al. |
| 2009/0030753 | A1* | 1/2009 | Senturk-Doganaksoy et al. ......... 705/7 |
| 2009/0031066 | A1 | 1/2009 | Bansal et al. |
| 2009/0249094 | A1* | 10/2009 | Marshall et al. ............. 713/320 |
| 2009/0300317 | A1* | 12/2009 | Hepkin ................. G06F 9/4812 711/173 |
| 2010/0039433 | A1 | 2/2010 | McGreevy et al. |
| 2010/0128058 | A1* | 5/2010 | Kawabata ......... G06F 17/30274 345/593 |
| 2010/0268816 | A1* | 10/2010 | Tarui et al. ................... 709/224 |
| 2010/0275184 | A1 | 10/2010 | Nir et al. |
| 2011/0055817 | A1 | 3/2011 | Noble et al. |
| 2011/0071867 | A1 | 3/2011 | Chen et al. |
| 2011/0145657 | A1 | 6/2011 | Bishop et al. |
| 2011/0191609 | A1 | 8/2011 | Van Bokhoven et al. |
| 2012/0084413 | A1 | 4/2012 | Pasternak |
| 2012/0262472 | A1* | 10/2012 | Garr et al. .................... 345/589 |
| 2012/0278658 | A1 | 11/2012 | Han et al. |
| 2013/0061162 | A1 | 3/2013 | Rhodes |
| 2013/0061167 | A1 | 3/2013 | Rhodes |
| 2013/0067378 | A1 | 3/2013 | Au |

OTHER PUBLICATIONS

Internet Archive Wayback Machine capture of Dictionary.com definition of "Processor", dated Jul. 2, 2011.*
Internet Archive Wayback Machine capture of Dictionary.com definition of "Process", dated Jul. 2, 2011.*
Internet Archive Wayback Machine capture of Dictionary.com definition of "Graph", dated Jul. 2, 2011.*
"Performance Insights to Intel Hyper-Threading Technology" by Antonio Valles, published Nov. 20, 2009 and retrieved from https://software.intel.com/en-us/articles/performance-insights-to-intel-hyper-threading-technology.*
"Top 10 Windows Server 2008 R2 Features #9: Processor core parking" by Scott M. Fulton III, published Sep. 25, 2009 and retrieved from http://betanews.com/2009/09/25/top-10-windows-server-2008-r2-features-9-processor-core-parking/.*
"How do I Find Out Linux CPU Utilization?" by Vivek Gite, published Apr. 6, 2006 and retrieved from http://www.cyberciti.biz/tips/how-do-i-find-out-linux-cpu-utilization.html.*
"Less Than Vs Less Than of Equal To—which is more efficient?" by Toby Osbourn, published on Sep. 24, 2011, retrieved from http://tosbourn.com/less-than-vs-less-than-or-equal-to/ on Jun. 30, 2016.*
"Using Windows 7 Tools to Discover System Information" published Jun. 23, 2011 at http://allcomputers.us/windows_7/Using-Windows-7-Tools-to-Discover-System-Information.aspx Retrieved from Internet archive Wayback machine capture of Jul. 7, 2011. 8 pages.*
"Cluster Monitoring with Stacked Graphs and Heat Maps" by Thorsten von Eicken, published online Nov. 3, 2010, 5 pages. Retrieved from https://www.rightscale.com/blog/cloud-management-best-practices/cluster-monitoring-stacked-graphs-and-heat-maps on Nov. 29, 2017.*
"Non-Final Office Action", U.S. Appl. No. 13/227,023, (dated Apr. 25, 2013), 16 pages.
"Non-Final Office Action", U.S. Appl. No. 13/229,592, (dated May 9, 2013), 14 pages.
Williams, Mike "15 Task Manager tips for a faster PC", Retrieved from <http://www.techradar.com/us/news/computinq/pc/15-task-manager-tips-for-a-faster-pc-649623> on Apr. 25, 2013, (Nov. 12, 2009), 6 pages.
"Final Office Action", U.S. Appl. No. 13/229,592, (dated Jul. 31, 2013), 16 pages.
"Auslogics Task Manager Description", Retrieved from: <http://www.softpedia.com/get/System/System-Info/Auslogics-Task-Manager.shtml> on Jun. 16, 2011,(Jun. 1, 2011),2 pages.
"Bandwidth Monitoring Tools for Linux", Retrieved from: <http://www.ubuntugeek.com/bandwidth-monitoring-tools-for-linux.html> on Jun. 16, 2011,(Mar. 28, 2007),15 pages.
"Netconnect Meter", Retrieved from: <http://www.jaysonjc.com/projects/netconnect-meter> on Jun. 16, 2011,3 pages.
"Network Traffic Monitoring", Retrieved from: <http://www.monitortools.com/traffic/> on Jun. 16, 2011,17 pages.
"Task Manager", Retrieved from: <http://sourcedaddy.com/windows-7/task-manager.html> on Jun. 16, 2011,3 pages.
Noraziah, A et al., "System Memory Monitoring Through Windows Application Programming Interface", *In Proceedings of ICADIWT 2008*, Available at <http://ieeexplore.ieee.org/stamp/stamp.jsp?arnumber=04664372>,(Aug. 2008),pp. 354-359.
"Final Office Action", U.S. Appl. No. 13/227,023, dated Feb. 13, 2014, 20 pages.
Gregg, Brendan, "Visualizing System Latency", Retrieved at «http://delivery.acm.org/10.1145/1810000/1809426/p30-gregg.pdf?ip=203.8.109.15&acc=OPEN&CFID=67521831&CFTOKEN=87946092&_acm_=1320744520_8e047fbd12097dee1d42b62ca61963fd» Communications of the ACM, Jul. 2010, pp. 13.
Kevin, "Compare performance attributes through Heat Charts", Retrieved at «http://blogs.manageengine.com/appmanager/2010/05/10/compare-performance-attributes-through-heat-charts», May 10, 2011, pp. 1-3.
"Understanding Node List, Heat Map, and Custom Tab Views", Retrieved at «http://technet.microsoft.com/en-us/library/ff919399(WS.10).aspx», Jun. 21, 2011, pp. 1-3.
"First Office Action and Search Report issued in Chinese Patent Application No. 201210416294.7", dated Jan. 19, 2015, 14 Pages.
"Non-Final Office Action", U.S. Appl. No. 13/229,592, dated May 28, 2014, 18 pages.
"Final Office Action", U.S. Appl. No. 13/229,592, dated Oct. 23, 2014, 19 pages.
"Notice of Allowance", U.S. Appl. No. 13/227,023, dated May 9, 2014, 8 pages.
"Foreign Office Action", CN Application No. 201210416294.7, dated Oct. 10, 2015, 10 pages.
"Third Office Action Issued in Chinese Patent Application No. 201210416294.7", dated Mar. 3, 2016, 7 Pages.

* cited by examiner

LOGICAL CPU DIVISION USAGE HEAT MAP REPRESENTATION

RELATED APPLICATIONS

This application claims priority to U.S. Provisional Application Ser. No. 61/551,886, filed Oct. 26, 2011, entitled "Logical Processors Heat Map Representation", to Christina L. Rhodes, et al., the disclosure of which is hereby incorporated by reference herein in its entirety.

BACKGROUND

As technology has advanced, central processing units (CPUs) used in various computing devices have evolved from having a single instruction execution core executing instructions serially to having multiple instruction execution cores and logical divisions executing instructions in parallel. These computing devices have also evolved from having a single CPU to having multiple CPUs executing instructions in parallel. Although these advances have increased the processing power of computing devices, they are not without their problems. One such problem is that given the large number of logical CPU divisions that can be included in a computing device, it can be difficult for a user to monitor the activity across all of the computing device's logical CPU divisions.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

In accordance with one or more aspects, a logical central processing unit (CPU) division management view is displayed at a device as a heat map representation. The heat map representation includes multiple cells, each of which corresponds to one of multiple logical CPU divisions of the device. As part of the heat map representation, each of the multiple cells is displayed in one of multiple different manners based on a usage of the corresponding logical CPU division.

In accordance with one or more aspects, if a device having multiple logical central processing unit (CPU) divisions has less than a threshold number of logical CPU divisions, then a logical CPU division management view for the device is displayed as a graph representation. The graph representation includes one or more graphs, each of which identifies usage of a corresponding one of the multiple logical CPU divisions. However, if the device has at least the threshold number of logical CPU divisions, then the logical CPU division management view for the device is displayed as a heat map representation. The heat map representation includes multiple cells each corresponding to a logical CPU division, and each of the multiple cells is displayed in one of multiple different manners based on a usage of the corresponding logical CPU division.

BRIEF DESCRIPTION OF THE DRAWINGS

The same numbers are used throughout the drawings to reference like features.

DETAILED DESCRIPTION

A logical CPU division usage heat map representation is discussed herein. A computing device includes multiple logical CPU divisions, such as multiple logical processors. The usage of these multiple logical CPU divisions can be displayed in various manners. If the computing device includes less than a threshold number of logical CPU divisions, then a graph representation is used in which multiple graphs are displayed and each graph is a graph of the usage of a corresponding logical CPU division over a particular amount of time. However, if the computing device includes at least a threshold number of logical CPU divisions, then a heat map representation is used in which a table having multiple cells is displayed and each cell displays the usage of a corresponding logical CPU division. Each cell is displayed in one of multiple different manners (such as using different color intensities) based on the usage of the corresponding logical CPU division.

Figure 1:
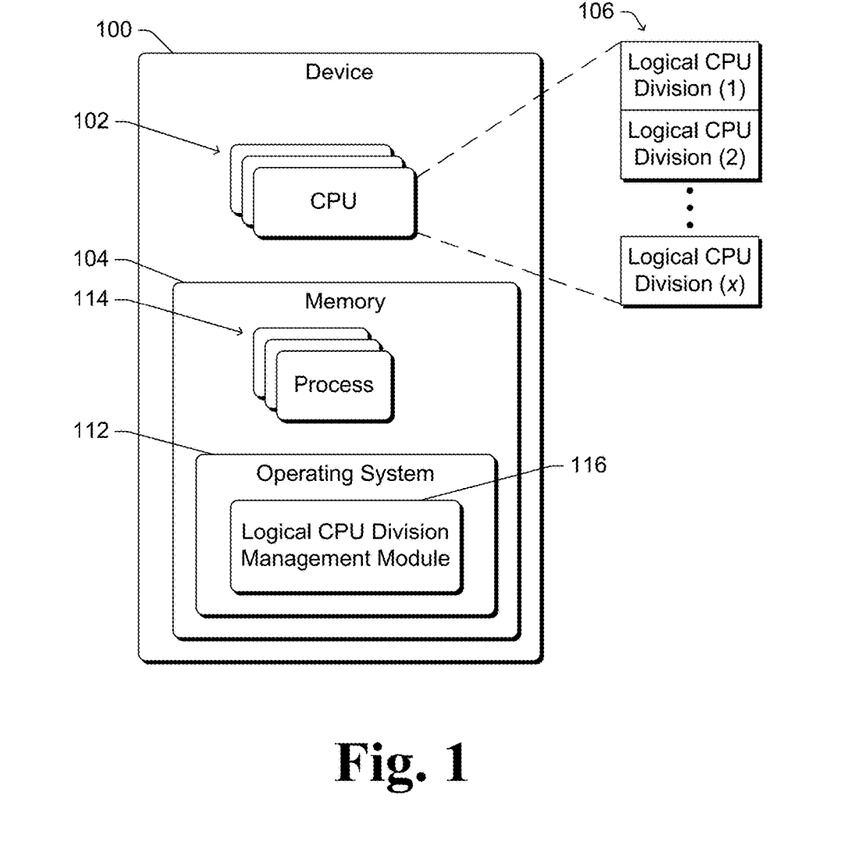
FIG. 1 is a block diagram illustrating an example device implementing the logical CPU division usage heat map representation in accordance with one or more embodiments.

FIG. 1 is a block diagram illustrating an example device 100 implementing the logical CPU division usage heat map representation in accordance with one or more embodiments. Device 100 can be a variety of different types of devices, such as a physical device or a virtual device. For example, device 100 can be a physical device such as a desktop computer, a server computer, a laptop or netbook computer, a tablet or notepad computer, a mobile station, an entertainment appliance, a set-top box communicatively coupled to a display device, a television or other display device, a cellular or other wireless phone, a game console, an automotive computer, and so forth. Device 100 can also be a virtual device, such as a virtual machine running on a physical device. A virtual machine can be run on any of a variety of different types of physical devices (e.g., any of the various types listed above).

Device 100 includes one or more central processing units (CPUs) 102 and memory 104. CPUs 102 can each include multiple (x) logical CPU divisions 106. Each logical CPU division 106 is a logical (rather than physical) division, allowing a single CPU 102 to be treated as multiple CPUs.

Different CPUs 102 can have the same number of logical CPU divisions 106 and/or different CPUs 102 can have different numbers of logical CPU divisions 106. Each CPU 102 can have one or more cores, and each core of a CPU 102 can have one or more logical CPU divisions 106. Different cores can have the same number of logical CPU divisions 106 and/or different cores can have different numbers of logical CPU divisions.

In one or more embodiments, each logical CPU division is a logical processor. Each logical processor is addressed and viewed by the operating system running on computing device 100 as a separate CPU (or alternatively a separate CPU core) even though multiple such logical processors can be (and typically are) implemented by or on the same CPU 102 (or same core of the same CPU 102). Alternatively, each logical CPU division can be a different logical division, such as a Non-Uniform Memory Access (NUMA) node. Each NUMA node includes a region of memory, and may also include a logical processor, CPU, and/or CPU core. Although many of the discussions herein refer to logical processors, it should be noted that such discussions also apply to other logical CPU divisions such as NUMA nodes.

Memory 104 includes volatile memory (e.g., random access memory (RAM)) and/or nonvolatile memory (e.g., Flash memory, read only memory (ROM)). Memory 104 stores instructions that are executed by one or more CPUs 102. Memory 104 includes an operating system 112 and one or more processes 114. Various different programs can be run on device 100 as processes 114, such as entertainment programs, gaming programs, resource programs, utility programs, productivity programs, and so forth. Operating system 112 manages running of processes 114, including launching processes 114 in response to user requests to run programs, and ceasing execution of processes 114 in response to user requests to terminate a process.

Operating system 112 includes a logical CPU division management module 116 that obtains information regarding logical CPU divisions 106. Management module 116 also generates one or more logical CPU division management views, including a graph representation (also referred to as a graph view) and a heat map representation (also referred to as a heat map view) as discussed in more detail below. Management module 116 displays, in these logical CPU division management views, logical CPU division usage.

These logical CPU division management views are displayed or otherwise presented by management module 116 via a user interface (UI). Various user inputs can also be provided via the UI using a variety of different input mechanisms, such as by pressing one or more keys of a keypad or keyboard of device 100, pressing one or more keys of a controller of device 100, pressing a particular portion of a touchpad or touchscreen of device 100, making a particular gesture on a touchpad or touchscreen of device 100, making a particular gesture on a controller of device 100, providing audible inputs to a microphone, making particular motions of hands or other body parts observed by an image capture component, and so forth. Through these various user inputs a user is able to select a particular button, portion of a display, menu option, and so forth. Although a single management module 116 is illustrated in FIG. 1, it should be noted that the functionality of module 116 can alternatively be separated into multiple modules.

In the illustrated example of FIG. 1, device 100 includes both CPUs 102 and logical CPU division management module 116, and the logical CPU division management views are generated and displayed on the same device as includes CPUs 102. Alternatively, the logical CPU division management views can be generated on the same device as includes CPUs 102, and signals provided to another device on which the logical CPU division management views are displayed. Alternatively, logical CPU division management module 116 can be included on a different device than CPUs 102, and thus the logical CPU division management views can be generated on (and displayed on) a different device than the device that includes CPUs 102.

Typically, management module 116 generates and displays a logical CPU division management view in response to a user input requesting that the logical CPU division management view be displayed. Alternatively, management module 116 can generate and display a logical CPU division management view in response to a variety of different events, such as a request from another component or module of device 100, a request from another device, and so forth.

In one or more embodiments, module 116 displays a logical CPU division management view as a graph representation if device 100 includes less than (or alternatively less than or equal to) a threshold number (e.g., 64) of logical CPU divisions 106, and displays a logical CPU division management view as a heat map representation if device 100 includes at least (or alternatively more than) the threshold number of logical CPU divisions 106. The threshold number can vary, and can optionally be set by a user or administrator of device 100. Alternatively, whether the graph representation or the heat map representation is displayed (and/or the threshold number) can be a configuration setting that a user or administrator of device 100 can set. There can also be an option to turn this feature of having different representations displayed on or off for any number of logical CPU divisions. This option can be selected by, for example, a user or administrator of device 100.

The usage of a logical CPU division refers to how much of the processing capacity of the logical CPU division is being used to execute processes (e.g., the percentage of the time the logical CPU division is busy rather than idle). These processes can include processes 114, as well as processes implementing at least part of operating system 112. This usage of the logical CPU division can also be referred to as the activity of the logical CPU division.

The usage of a logical CPU division can be determined in a variety of different manners. In one or more embodiments, the operating system (e.g., operating system 112 of FIG. 1) includes one or more modules that track an amount of logical CPU division usage for each logical CPU division of CPUs 102. In such embodiments, logical CPU division management module 116 obtains the amounts of logical CPU division for each logical CPU division from these one or more modules. Management module 116 can also obtain from these one or more modules, for each logical CPU division, the amount of logical CPU division usage by each process. Alternatively, the usage of each logical CPU division can be determined in other manners. For example, a logical CPU division manager (e.g., processor scheduler) may track the amounts of usage of each logical CPU division, and management module 116 can obtain the amounts of logical CPU division usage from this manager. Management module 116 can also obtain from this manager, for each logical CPU division, the amount of logical CPU division usage by each process.

Figure 2:
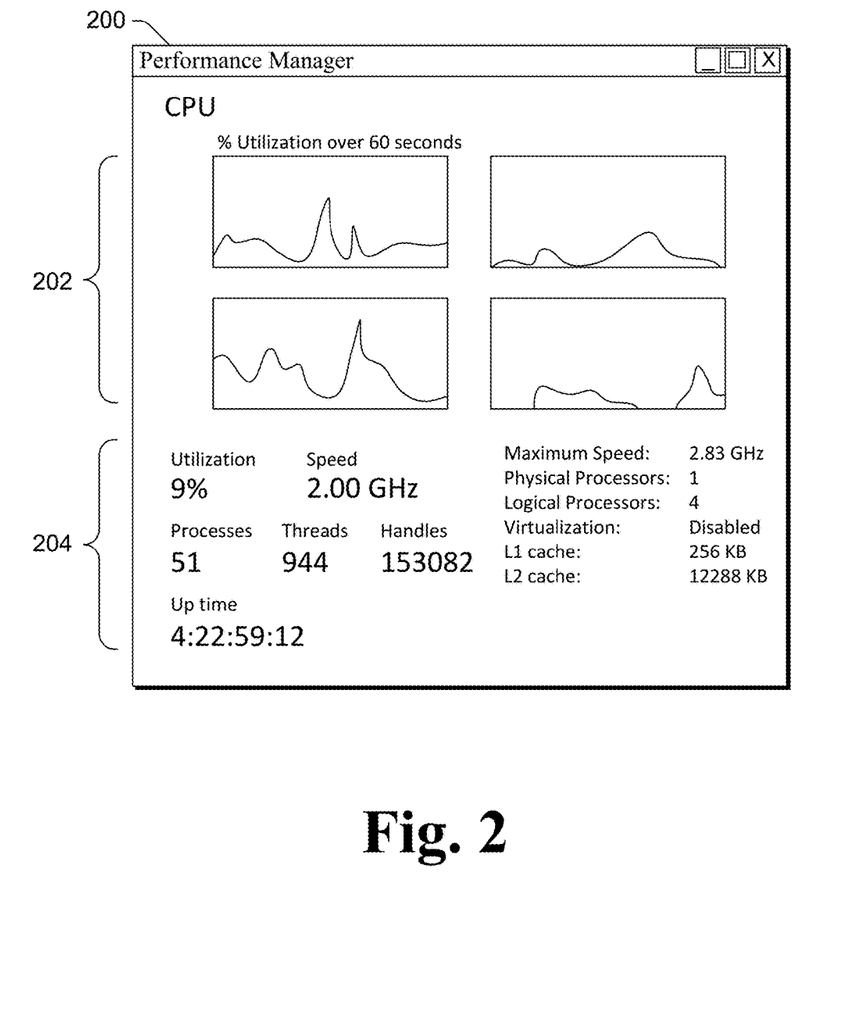
FIG. 2 illustrates an example graph representation of a logical CPU division management view in accordance with one or more embodiments.

FIG. 2 illustrates an example graph representation 200 of a logical CPU division management view in accordance with one or more embodiments. Graph representation 200 is discussed with reference to logical CPU divisions that are logical processors, although other logical CPU divisions can be displayed analogously in graph representation 200.

Graph representation 200 includes a graph portion 202 and a data portion 204. Graph portion 202 includes one graph corresponding to each of multiple logical processors. In the illustrated example, the device includes four logical processors, and thus graph portion 202 includes four graphs. Each graph in graph portion 202 illustrates the logical processor usage of a particular logical processor over a particular amount of time. For example, this particular amount of time can be 60 seconds, although other amounts of time can alternatively be used.

The logical processor usage can be displayed using various data units. For example, logical processor usage can be displayed as a percentage of the particular logical processor, such as a percentage of logical processor capacity used (e.g., a percentage of the total available logical processor capacity). Alternatively, other data units can be used.

In one or more embodiments, by default each graph displays the logical processor usage as a percentage of time the logical processor is busy rather than idle, regardless of whether the logical processor is executing code in kernel or other (e.g., user) mode. However, the user can optionally select to turn on "Show kernel usage" by providing various inputs (e.g., selection of a menu item, selection of a button, entering a particular gesture, etc.). The kernel usage refers to the utilization of the logical processor in executing code in kernel mode, and each graph in graph portion 202 can include an additional line (not shown) illustrating the usage of each logical processor in executing code in kernel mode. Thus, when showing kernel usage, each graph in graph portion 202 includes two lines: one line illustrating the usage of the corresponding logical processor regardless of the mode in which code is being executed, and another line illustrating the usage of the corresponding logical processor in executing code in kernel mode. These two lines in a graph can be displayed in different manners, such as different patterns (e.g., solid and dashed) for the two lines, different colors for the two lines, different intensities or widths of the lines, and so forth.

In the illustrated example of FIG. 2, each graph has a horizontal axis that identifies a time range (e.g., the previous 60 seconds), and a vertical axis that identifies a percentage of the logical processor capacity being used (e.g., ranging from 0% to 100%) at various points in time (e.g., every second) over the time range. The graphs are illustrated as line graphs, although any of a variety of different types of graphs and/or charts can alternatively be used, such as stacked line graphs, bar graphs, stacked bar graphs, Gantt charts, and so forth.

In one or more embodiments, additional information related to the logical processor corresponding to a graph in graph portion 202 is displayed in a tooltip or other window or area. The additional information can be displayed, for example, when hovering over a graph (e.g., when a cursor or finger is located on or over a displayed graph), when a graph is selected (e.g., by a user touching the graph), and so forth. Various additional information can be displayed in such a tooltip or other window or area, as discussed in more detail below.

In the illustrated example of FIG. 2, each graph corresponds to and displays usage of a single logical processor. Alternatively, in some situations a graph could correspond to and display usage of multiple logical processors (e.g., the usages of multiple logical processors averaged together).

Data portion 204 includes various data related to the CPUs on or by which the logical processors are implemented. In the illustrated example, data regarding the usage or utilization of the CPUs (e.g., 9% as illustrated), the speed of the CPUs (e.g., 2.00 GHz as illustrated), the number of processes running on the CPUs (e.g., 51 as illustrated), the number of threads running on the CPUs (e.g., 944 as illustrated), the number of handles being managed by the operating system on the CPUs (e.g., 153,082 as illustrated), and an up time for the CPUs such as the amount of time since the device was last reset or powered on (e.g., 4:22:59:12 as illustrated, such as 4 hours, 22 minutes, 59 and $12/100$ seconds) are included in data portion 204. Additionally, in the illustrated example, a maximum speed of the CPUs (e.g., 2.83 GHz as illustrated), a number of physical processors or CPUs in the device (e.g., 1 in the illustrated example), a number of logical processors implemented on or by the CPUs in the device (e.g., 4 in the illustrated example), whether virtualization for the CPUs is enabled or disabled (e.g., disabled in the illustrated example), a size of an L1 cache used by the CPUs (e.g., 256 KB (kilobytes) in the illustrated example) and a size of an L2 cache used by the CPUs (e.g., 12,288 KB in the illustrated example) are also included in data portion 204. It should be noted that the data included in data portion 204 is an example of data that can be displayed along with the graphs in graph portion 202. However, not all of the data illustrated in data portion 204 need be displayed, and/or additional data can be included in data portion 204. For example, data portion 204 may include no data (in which case graph representation includes graph portion 202 but not data portion 204), only an indication of a number of logical processors, data identifying the scales of the horizontal axis and/or vertical axis in graph portion 202, and so forth.

The data displayed in graph portion 202 and/or data portion 204 updates at regular or irregular intervals, such as once a second by default. This interval can optionally be set by a user or administrator of the device including the logical processors and/or implementing the logical CPU division management module (e.g., module 116 of FIG. 1).

In the illustrated example data portion 204 displays data across all logical processors. Alternatively, data portion 204 can display data organized in different manners, such as by CPU with a separate sub-division displaying data (analogous to that illustrated in data portion 204) for each CPU, by CPU core with a separate sub-division displaying data (analogous to that illustrated in data portion 204) for each CPU core, and so forth.

Figure 3:
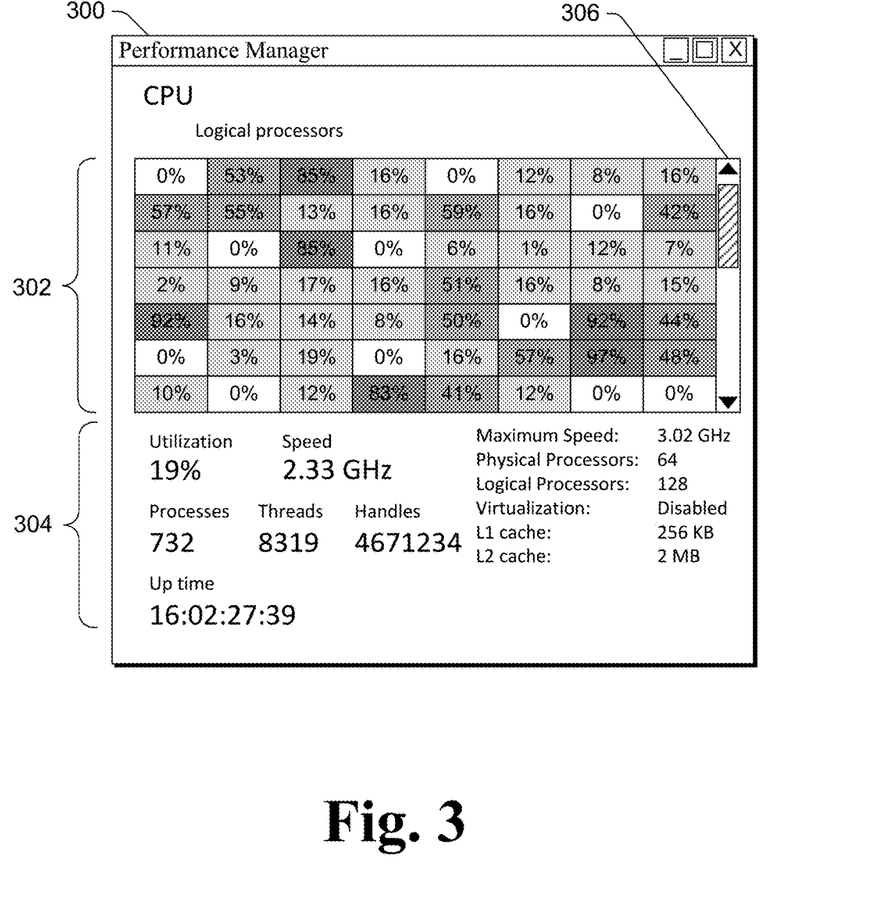
FIG. 3 illustrates an example heat map representation of a logical CPU division management view in accordance with one or more embodiments.

FIG. 3 illustrates an example heat map representation 300 of a logical CPU division management view in accordance with one or more embodiments. Heat map representation 300, also referred to as a table view or table representation, is discussed with reference to logical CPU divisions that are logical processors, although other logical CPU divisions can be displayed analogously in heat map representation 300.

Heat map representation 300 includes a heat map portion 302 and a data portion 304. Heat map portion 302 includes a table or grid having multiple cells, each cell corresponding to one of multiple logical processors. In the example heat map representation 300, each cell includes a value indicating logical processor usage. For example, the top left cell in heat map portion 302 indicates that the usage of the corresponding logical processor is 0%, the top right cell in heat map portion 302 indicates that the usage of the corresponding logical processor is 16%, and so on. The value indicating logical processor usage can be displayed using various data units. For example, processor usage can be displayed as a percentage of the particular logical processor, such as a percentage of logical processor capacity used (e.g., a percentage of the total available logical processor capacity).

Alternatively, other data units can be used (e.g., a number of instructions per second executed by the corresponding logical processor).

Additionally, in heat map portion 302 each cell is displayed in one of multiple different manners based on the usage of the corresponding logical processor. In one or more embodiments, these multiple different manners include color-coding the cells using various color intensities to indicate how much of the logical processor capacity is being used. In the example heat map representation 300 the backgrounds of the cells are color-coded using the different color intensities. Alternatively, rather than color-coding the backgrounds of the cells, the color intensities can be used in different manners, such as used to color-code the value indicating logical processor usage, used to color-code an outline or border around the cell, and so forth.

Color-coding cells with different color intensities refers to a graphical representation of data where the values taken by a variable are represented as intensities, which are a combination of decreasing (or increasing) luminosity and increasing (or decreasing) saturation. This can be visually manifested by different colors or shades. The use of a heat map allows for quick visual identification of logical processor usages, with more intense colors indicating higher usage than less intense colors.

Table I illustrates an example of color intensities for the heat map that can be used for different logical processor usage values. In the example of Table I, logical processor usage values are determined as a percentage of logical processor capacity used, and different ranges of logical processor usage values correspond to different intensities. Lower numbered intensities are less intense than higher numbered intensities (e.g., intensity 1 is less intense than intensity 4). The difference in intensities between different intensity values can be non-linear or linear. For example, the difference in intensity between intensity 1 and intensity 2 can be the same as the difference in intensity between intensity 4 and intensity 5, or the differences can be different (e.g., the difference in intensity between intensity 1 and intensity 2 may be less than the difference in intensity between intensity 4 and intensity 5). It should be noted that Table I is an example of color intensities that can be used, but that any number of intensities can be used, any level of granularity can be used, and so forth.

TABLE I

| % of Logical Processor Used | Intensity |
|---|---|
| 0 | Intensity 1 |
| 1-20 | Intensity 2 |
| 21-40 | Intensity 3 |
| 41-60 | Intensity 4 |
| 61-80 | Intensity 5 |
| 81-100 | Intensity 6 |

In one or more embodiments, the indication of logical processor usage and color intensity determined based on the logical processor usage are based on logical processor usage at a particular point in time. This logical processor usage can be updated at regular or irregular intervals, such as once a second by default. This interval can optionally be set by a user or administrator of the device including the logical processors and/or implementing the logical CPU division management module (e.g., module 116 of FIG. 1). Alternatively, the indication of logical processor usage and color intensity determined based on the logical processor usage are based on logical processor usages at multiple points in time (e.g., an average of logical processor usages over a time interval, such as five seconds).

When the logical processor usages are updated, the cells in heat map portion 302 are also updated to reflect the new logical processor usage values. The cells can also be updated to be displayed in different manners (e.g., using different color intensities) if updated usage of the logical processor results in the logical processor usage value being in a different range. For example, if a logical processor usage value were 25% but was then updated to 55%, then the corresponding cell would be updated to display "55%" rather than "25%", and the intensity would be Intensity 4 rather than Intensity 3 per Table I. Thus, as a user views heat map representation 300, heat map portion 302 is updated in real time to display the logical processor usages as the user is viewing heat map representation 300.

In the illustrated example of FIG. 3, each cell corresponds to and displays usage of a single logical processor. Alternatively, in some situations a cell could correspond to and display usage of multiple logical processors (e.g., the usages of multiple logical processors averaged together).

Data portion 304 includes various data related to the CPUs on or by which the logical processors are implemented, analogous to the data displayed in data portion 204 discussed above with reference to FIG. 2. In the illustrated example, data regarding the usage or utilization of the CPUs (e.g., 19% as illustrated), the speed of the CPUs (e.g., 2.33 GHz as illustrated), the number of processes running on the CPUs (e.g., 732 as illustrated), the number of threads running on the CPUs (e.g., 8319 as illustrated), the number of handles being managed by the operating system on the CPUs (e.g., 4,671,234 as illustrated), and an up time for the CPUs such as the amount of time since the device was last reset or powered on (e.g., 16:02:27:39 as illustrated, such as 16 hours, 2 minutes, 27 and $^{39}/_{100}$ seconds) are included in data portion 204. Additionally, in the illustrated example, a maximum speed of the CPUs (e.g., 3.02 GHz as illustrated), a number of physical processors or CPUs in the device (e.g., 64 in the illustrated example), a number of logical processors implemented on or by the CPUs in the device (e.g., 128 in the illustrated example), whether virtualization for the CPUs is enabled or disabled (e.g., disabled in the illustrated example), a size of an L1 cache used by the CPUs (e.g., 256 KB in the illustrated example) and a size of an L2 cache used by the CPUs (e.g., 2 MB (megabytes) in the illustrated example) are also included in data portion 304. It should be noted that the data included in data portion 304 is an example of data that can be displayed along with the cells in heat map portion 302. However, not all of the data illustrated in data portion 304 need be displayed, and/or additional data can be included in data portion 304. For example, data portion 304 may include no data (in which case heat map representation 300 includes heat map portion 302 but not data portion 304), only an indication of a number of logical processors, and so forth.

In the illustrated example data portion 304 displays data across all logical processors, analogous to data portion 204 discussed above with reference to FIG. 2. Alternatively, data portion 304 can display data organized in different manners, such as by CPU with a separate sub-division displaying data (analogous to that illustrated in data portion 304) for each CPU, by CPU core with a separate sub-division displaying data (analogous to that illustrated in data portion 304) for each CPU core, and so forth.

In one or more embodiments, a logical processor can be parked. A parked logical processor refers to a logical processor that is operating in a particular state that restricts the activity that can be performed by the logical processor. Various restrictions can be placed on a parked logical processor, such as restrictions on types of threads that can be run on the parked logical processor, restrictions on types of processes that can be run on the parked logical processor, and so forth. A logical processor can be parked if the logical processor is implemented on a core of a CPU that is parked. A core being parked can allow, for example, the core to be placed in an idle or other low power state in order to conserve power.

Heat map portion 302 can include an indication of which cells correspond to logical processors that are parked, allowing a user to readily see by looking at heat map portion 302 which cells correspond to parked logical processors. In one or more embodiments, an outline or border is placed around a cell to indicate that the logical processor is parked. This outline or border can be of the same color as is used for the color intensities of the heat map discussed above, but having a contrast ratio proportional to the color intensity used for the cell (e.g., to color-code the background of the cell, to color-code the value indicating logical processor usage, and so forth). The contrast ratio is proportional, so the intensity of the outline or border varies based on the color intensity used for the cell, resulting in no one outline or border standing out visually more than any other outline or border.

An indication of a parked logical processor can also take different forms. For example, rather than using an outline or border of the same color as is used for the color intensities of the heat map, this outline or border can be of a different color than is used for the color intensities of the heat map discussed above. By way of another example, a particular value for the logical processor usage (e.g., a value of "- -" or a value of "parked") can be displayed in the cell corresponding to the parked logical processor.

Additionally, in one or more embodiments, a tooltip corresponding to a cell in heat map portion 302 is displayed. The tooltip can be displayed, for example, when hovering over a cell (e.g., when a cursor or finger is located on or over a displayed cell), when a cell is selected (e.g., by a user touching the cell), and so forth. The tooltip refers to an additional window or other area in which additional information related to the logical processor corresponding to the cell is displayed. Alternatively, rather than displaying the additional information related to the logical processor in a tooltip, a separate (e.g., fixed) window or area of can be used to display additional information related to the logical processor corresponding to the cell that is hovered over, selected, etc.

The tooltip displays various information related to the logical processor corresponding to the cell, such as an identifier of the logical processor, an indication of whether the logical processor is parked, an identifier of the CPU and/or core that implements the logical processor, and so forth. Various other information can alternatively and/or additionally be displayed, such as identifiers of a particular number of (e.g., three) processes contributing to usage of the corresponding logical processor (e.g., the processes that contribute most to usage of the corresponding logical processor), the usage of the corresponding logical processor, the number of processes or threads running on the corresponding logical processor, the usage of the corresponding logical processor in executing code in kernel mode, and so forth. Various other information related to the corresponding logical processor, the CPU that implements the corresponding logical processor, and/or the core of the CPU that implements the corresponding logical processor can additionally and/or alternatively be displayed in the tooltip.

Figure 4:
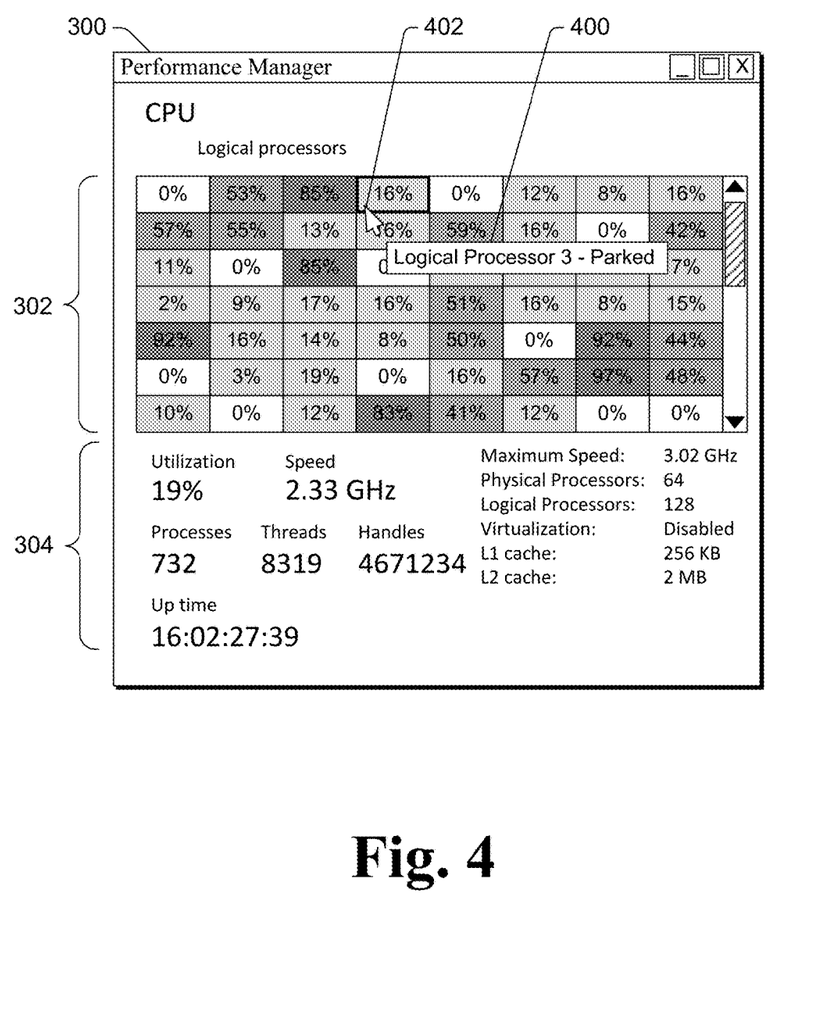
FIG. 4 illustrates an example tooltip in accordance with one or more embodiments.

FIG. 4 illustrates an example tooltip 400 in accordance with one or more embodiments. FIG. 4 illustrates heat map representation 300 of FIG. 3, with a tooltip 400. Tooltip 400 displays an identifier (3) of the logical processor corresponding to the cell that cursor 402 is hovering over, and an indication that the logical processor corresponding to the cell that cursor 402 is hovering over is parked. An outline or border is also placed around the cell that cursor 402 is hovering over to indicate that the logical processor corresponding to the cell that cursor 402 is hovering over is parked. This outline or border can be displayed in different manners as discussed above, such as displayed using the same color as is used for the color intensities of the heat map but having a contrast ratio proportional to the color intensity used for the cell, displayed using a different color than is used for the color intensities of the heat map, and so forth.

Returning to FIG. 3, cells in heat map portion 302 can be laid out in any of a variety of different manners. In one or more embodiments, to lay out the cells in heat map portion 302, the size of the largest block for the language being used by the device including the logical processors and/or implementing the logical CPU division management module (e.g., module 116 of FIG. 1) is determined. As many blocks as will fit horizontally are fit in the available area of heat map portion 302 first, and then rows are stacked vertically as appropriate to show as many logical processors as will fit in the area of heat map portion 302. A scroll bar 306 can be included in heat map portion 302 if more cells are included in portion 302 than can be displayed at a single time.

In one or more embodiments, if the window including heat map portion 302 is resized (e.g., by the user), then the blocks are laid out again as discussed above. Resizing the window that includes heat map portion 302 does not alter the cell size, but can alter the layout order of the cells. Alternatively, if the window including heat map portion 302 is resized, then the cell sizes can similarly be resized in addition to (or in place of) altering the layout order of the cells.

Additionally, whether the logical processor usage values are displayed in the cell can vary based on the size of the window including heat map portion 302. For example, if the window is at least a threshold size (e.g., at least a threshold number of pixels are included in the window), then the logical processor usage values are displayed in the cells of heat map portion 302 (e.g., as illustrated in FIG. 3). However, if the window is not at least the threshold size, then the logical processor usage values are not displayed in the cells of heat map portion 302. Rather, the different color intensities (or other different manners for displaying cells) alone can be displayed as discussed in more detail below.

In one or more embodiments, cells in heat map portion 302 are laid out sequentially according to logical processor identifier. For example, the top left cell in heat map portion 302 can correspond to logical processor 0, the next cell to the right in heat map portion 302 can correspond to logical processor 1, and so forth. No indication of which CPU or core implements logical processors corresponding to the displayed cells is displayed in heat map portion 302 (although may be displayed in a tooltip, as discussed above). These logical processor identifiers can be assigned in different manners, such as by an operating system (e.g., operating system 112 of FIG. 1) running on the CPUs.

Alternatively, heat map portion 302 can be organized in a manner to identify which CPU or core implements logical processors corresponding to the displayed cells in heat map portion 302. For example, white space can be left around, or borders can be drawn around, groups of logical processors and an identifier displayed of the CPU and/or core implementing each group of logical processors.

In one or more embodiments, by default each cell displays the logical processor usage value. This logical processor usage is the percentage of time the logical processor is busy rather than idle, regardless of whether executing code in kernel or other (e.g., user) mode as discussed above. However, a user can optionally select to turn on "Show kernel usage", in response to which each cell in heat map portion 302 indicates the kernel usage, such as by having a second value in parenthesis after the first for the kernel usage.

Figure 5:
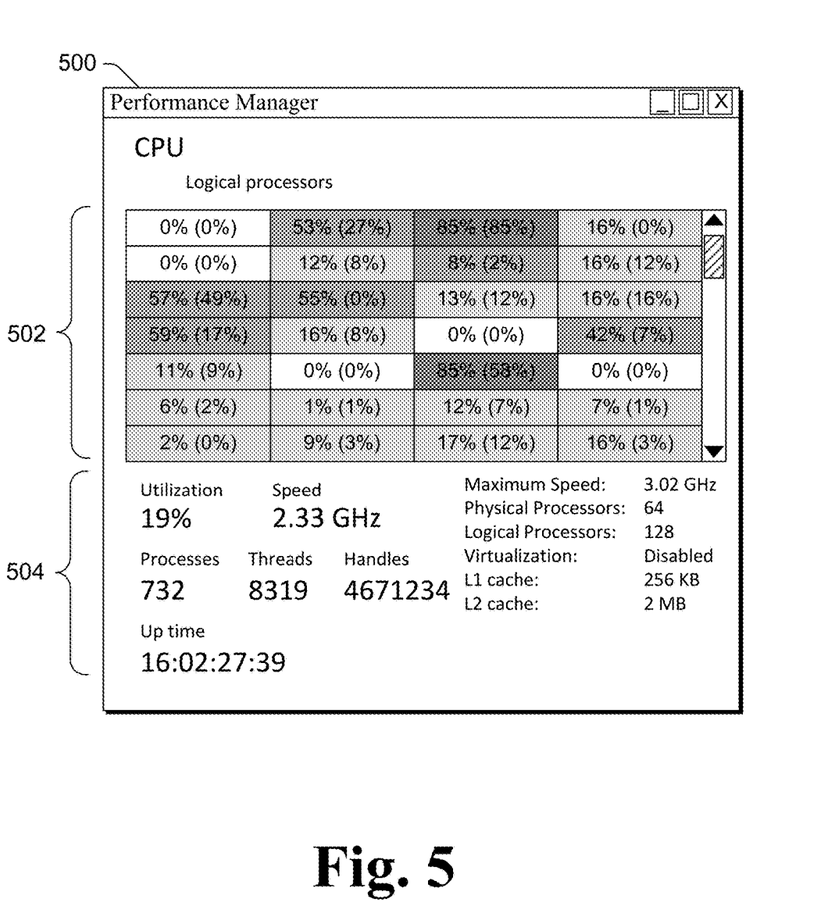
FIG. 5 illustrates an example heat map representation of a logical CPU division management view in accordance with one or more embodiments.

FIG. 5 illustrates an example heat map representation 500 of a logical CPU division management view in accordance with one or more embodiments. Heat map representation 500, also referred to as a table view or table representation, is discussed with reference to logical CPU divisions that are logical processors, although other logical CPU divisions can be displayed analogously in heat map representation 500.

Heat map representation 500 is analogous to heat map representation 300 of FIG. 3, but displays kernel usage in parenthesis in heat map portion 502 after the logical processor usage values. The color-coding of the cells in heat map portion 502 is based on the logical processor usage (the first number) rather than the kernel usage values in parenthesis, although alternatively the color-coding of the cells can be based on the kernel usage. Various data can be displayed in data portion 504 and/or tooltips, analogous to the discussion above regarding FIG. 3.

In the discussions regarding FIGS. 3, 4 and 5, the heat map representation is discussed as displaying logical processor usage values. In other embodiments, rather than displaying a value indicating logical processor usage for each of the logical processors and using different color intensities to indicate logical processor usage, no value indicating logical processor usage may be displayed. The different color intensities alone can be displayed (e.g., as a color in or background color of the cell, as a border around a cell, and so forth) to indicate logical processor usage.

Figure 6:
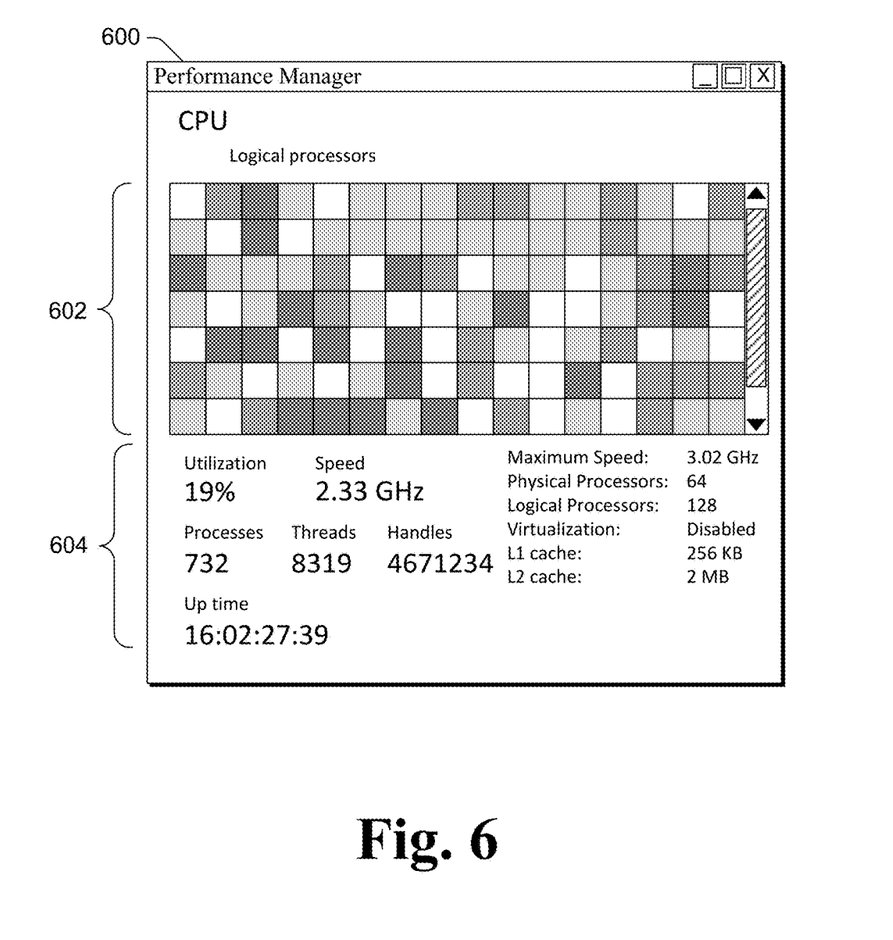
FIG. 6 illustrates an example heat map representation of a logical CPU division management view in accordance with one or more embodiments.

FIG. 6 illustrates an example heat map representation 600 of a logical CPU division management view in accordance with one or more embodiments. Heat map representation 600, also referred to as a table view or table representation, is discussed with reference to logical CPU divisions that are logical processors, although other logical CPU divisions can be displayed analogously in heat map representation 600.

Heat map representation 600 is analogous to heat map representation 300 of FIG. 3, but displays no logical processor usage values. The color-coding of the cells in heat map portion 602 is based on the logical processor usage, thus providing an indication of the usage of each logical processor corresponding to a cell even though the logical processor usage values are not displayed. Various data can be displayed in data portion 604 and/or tooltips, analogous to the discussion above regarding FIG. 3.

In the discussions regarding FIGS. 3-6, the cells in the heat map portion are discussed as being color-coded with different color intensities. These different color intensities are different intensities of the same color. Alternatively (or additionally), cells can be color-coded with different colors. For example, one color (e.g., red) may be used to indicate one range of logical processor usage values, another color (e.g., blue) may be used to indicate another range of logical processor usage values, another color (e.g., green) may be used to indicate another range of logical processor usage values, and so forth.

It should also be noted that the cells in heat map portion 302 can be displayed in other manners other than using color-coding to indicate how much of the logical processor capacity is being used. For example, different fonts and/or font sizes can be used to indicate logical processor usage, such as larger font sizes being used to indicate greater logical processor usage than smaller font sizes. By way of another example, different patterns and/or borders around cells can be used to indicate logical processor usage. For example, a cross-hatch pattern can be used to indicate one range of logical processor usage values, a solid pattern can be used to indicate another range of logical processor usage values, and so forth.

The logical CPU division usage heat map representation techniques discussed herein support various usage scenarios. On a device or system including a large number of logical CPU divisions, a user can quickly and easily view the usage of numerous ones of those logical CPU divisions concurrently. The user can thus readily identify if a particular one or more logical CPU divisions have very high usages, while others do not, and take any appropriate action desired by the user. Furthermore, displaying graphs in the graph representation typically uses more device resources (e.g., memory) than displaying the cells of the heat map view. Accordingly, as devices include more logical CPU divisions, displaying the heat map view rather than the graph representation reduces the device resources used in displaying the logical CPU division management view.

Figure 7:
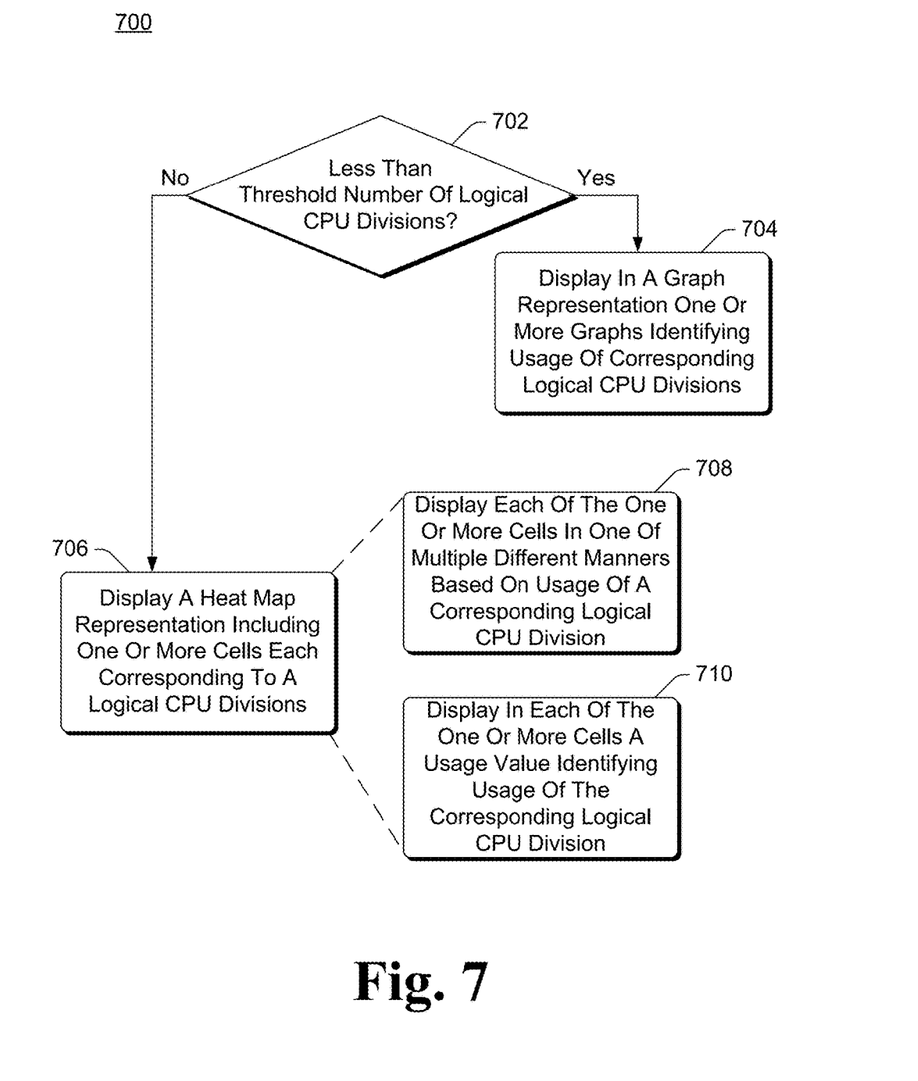
FIG. 7 is a flowchart illustrating an example process for a device implementing the logical CPU division usage heat map representation in accordance with one or more embodiments.

FIG. 7 is a flowchart illustrating an example process 700 for a device implementing the logical CPU division usage heat map representation in accordance with one or more embodiments. Process 700 is carried out by a device, such as device 100 of FIG. 1, and can be implemented in software, firmware, hardware, or combinations thereof. Process 700 is shown as a set of acts and is not limited to the order shown for performing the operations of the various acts. Process 700 is an example process for implementing the logical CPU division usage heat map representation; additional discussions of implementing the logical CPU division usage heat map representation are included herein with reference to different figures.

In process 700, a determination is made as to whether the device includes less than a threshold number of logical CPU divisions (act 702). These logical CPU divisions can be logical processors, as discussed above.

If the device includes less than the threshold number of logical CPU divisions, then in a graph representation one or more graphs identifying usage of corresponding logical CPU divisions are displayed (act 704). Additional information regarding the logical CPU divisions, CPU, and/or CPU cores can also be displayed as discussed above.

However, if the device includes at least the threshold number of logical CPU divisions, then a heat map representation including one or more cells each corresponding to a logical CPU division are displayed (act 706). As discussed above, displaying the heat map representation can include displaying each of the one or more cells in one of multiple different manners based on usage of a corresponding logical CPU division (act 708) and/or displaying in each of the one or more cells a usage value identifying usage of the corresponding logical CPU division.

Figure 8:
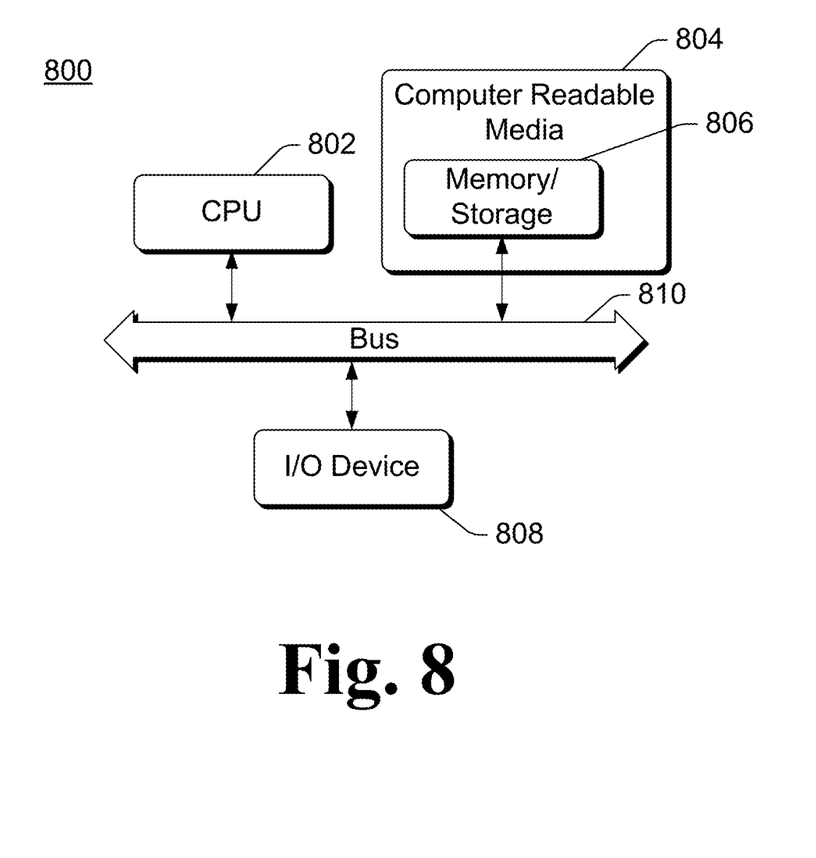
FIG. 8 illustrates an example computing device that can be configured to implement the logical CPU division usage heat map representation in accordance with one or more embodiments.

FIG. 8 illustrates an example computing device 800 that can be configured to implement the logical CPU division usage heat map representation in accordance with one or more embodiments. Computing device 800 can be, for example, device 100 of FIG. 1.

Computing device 800 includes one or more CPUs 802, one or more computer readable media 804 which can include one or more memory and/or storage components 806, one or more input/output (I/O) devices 808, and a bus 810 that allows the various components and devices to communicate with one another. Computer readable media 804 and/or one or more I/O devices 808 can be included as part of, or alternatively may be coupled to, computing device 800. CPU 802, computer readable media 804, one or more of devices 808, and/or bus 810 can optionally be implemented as a single component or chip (e.g., a system on a chip). Bus 810 represents one or more of several types of bus structures, including a memory bus or memory controller, a peripheral bus, an accelerated graphics port, a processor or local bus, and so forth using a variety of different bus architectures. Bus 810 can include wired and/or wireless buses.

Memory/storage component 806 represents one or more computer storage media. Component 806 can include volatile media (such as random access memory (RAM)) and/or nonvolatile media (such as read only memory (ROM), Flash memory, optical disks, magnetic disks, and so forth). Component 806 can include fixed media (e.g., RAM, ROM, a fixed hard drive, etc.) as well as removable media (e.g., a Flash memory drive, a removable hard drive, an optical disk, and so forth).

The techniques discussed herein can be implemented in software, with instructions being executed by one or more CPUs 802. It is to be appreciated that different instructions can be stored in different components of computing device 800, such as in a CPU 802, in various cache memories of a CPU 802, in other cache memories of device 800 (not shown), on other computer readable media, and so forth. Additionally, it is to be appreciated that the location where instructions are stored in computing device 800 can change over time.

One or more input/output devices 808 allow a user to enter commands and information to computing device 800, and also allows information to be presented to the user and/or other components or devices. Examples of input devices include a keyboard, a cursor control device (e.g., a mouse), a microphone, a scanner, and so forth. Examples of output devices include a display device (e.g., a monitor or projector), speakers, a printer, a network card, and so forth.

Various techniques may be described herein in the general context of software or program modules. Generally, software includes routines, programs, applications, objects, components, data structures, and so forth that perform particular tasks or implement particular abstract data types. An implementation of these modules and techniques may be stored on or transmitted across some form of computer readable media. Computer readable media can be any available medium or media that can be accessed by a computing device. By way of example, and not limitation, computer readable media may comprise "computer storage media" and "communication media."

"Computer storage media" include volatile and non-volatile, removable and non-removable media implemented in any method or technology for storage of information such as computer readable instructions, data structures, program modules, or other data. Computer storage media include, but are not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by a computer. Computer storage media refer to media for storage of information in contrast to mere signal transmission, carrier waves, or signals per se. Thus, computer storage media refers to non-signal bearing media, and is not communication media.

"Communication media" typically embody computer readable instructions, data structures, program modules, or other data in a modulated data signal, such as carrier wave or other transport mechanism. Communication media also include any information delivery media. The term "modulated data signal" means a signal that has one or more of its characteristics set or changed in such a manner as to encode information in the signal. By way of example, and not limitation, communication media include wired media such as a wired network or direct-wired connection, and wireless media such as acoustic, RF, infrared, and other wireless media. Combinations of any of the above are also included within the scope of computer readable media.

Generally, any of the functions or techniques described herein can be implemented using software, firmware, hardware (e.g., fixed logic circuitry), manual processing, or a combination of these implementations. The terms "module" and "component" as used herein generally represent software, firmware, hardware, or combinations thereof. In the case of a software implementation, the module or component represents program code that performs specified tasks when executed on a processor (e.g., CPU or CPUs). The program code can be stored in one or more computer readable memory devices, further description of which may be found with reference to FIG. 8. In the case of hardware implementation, the module or component represents a functional block or other hardware that performs specified tasks. For example, in a hardware implementation the module or component can be an application-specific integrated circuit (ASIC), field-programmable gate array (FPGA), complex programmable logic device (CPLD), and so forth. The features of the logical processors heat map representation techniques described herein are platform-independent, meaning that the techniques can be implemented on a variety of commercial computing platforms having a variety of processors.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A computing device comprising:
   one or more physical central processing units (CPUs), each physical CPU including multiple logical CPU divisions, and each of the logical CPU divisions being associated with a logical processor identifier;
   one or more computer storage media having stored thereon multiple instructions that, when executed by the one or more physical CPUs, configure the one or more physical CPUs to:
   determine whether the computing device has less than a threshold number of logical CPU divisions or has at least the threshold number of logical CPU divisions;
   cause display, by the computing device and in response to the determination that the computing device has less than the threshold number of logical CPU divisions, of a logical CPU division management view for the computing device as a graph representation, the graph representation including one or more graphs, each of the one or more graphs identifying multiple usage values of a corresponding one of the multiple logical CPU divisions at corresponding multiple times, each usage value of each of the multiple logical CPU divisions being a processing capacity of the logical CPU division that is being used to execute processes on the computing device;

cause display, by the computing device and in response to the determination that the computing device has at least the threshold number of logical CPU divisions, of the logical CPU division management view as a heat map representation, the heat map representation including multiple cells each corresponding to one of the multiple logical CPU divisions of the computing device and the multiple cells arranged sequentially according to the logical processor identifier associated with each of the logical CPU divisions, wherein causing display of the logical CPU division management view as a heat map representation comprises:

determining whether a window size of a window that displays the heat map representation is less than a threshold size or at least the threshold size;

causing display, by the computing device and in response to the determination that the window size is at least the threshold size, of a numeric usage value identifying the usage of the corresponding logical CPU division in each of the multiple cells; and causing display, by the computing device and in response to the determination that the window size is less than the threshold size, of a color intensity corresponding to a range of logical CPU division usage values in each of the multiple cells, without display of a numeric usage value in each of the multiple cells.

2. A computing device as recited in claim 1, each logical CPU division comprising a logical processor.

3. A computing device as recited in claim 1, the color intensities in the multiple cells comprising different intensities of a same color.

4. A computing device as recited in claim 1, the color intensities in the multiple cells comprising each of the multiple different manners comprising a color intensity of the multiple color intensities for backgrounds of one or more of the multiple cells.

5. A computing device as recited in claim 1, the multiple instructions further configuring the one or more physical CPUs to rearrange a layout order of the multiple cells without altering a cell size of the multiple cells in response to the window size of the window that displays the heat map representation being resized.

6. A computing device as recited in claim 1, the multiple instructions further configuring the one or more physical CPUs to cause display, for one or more of the multiple cells and in response to the determination that the window size is at least the threshold size, in the cell of a kernel usage value identifying kernel usage of the corresponding one of the multiple logical CPU divisions.

7. A computing device as recited in claim 1, the multiple instructions further configuring the one or more physical CPUs to cause display, by the computing device, of a tooltip for one of the multiple cells, the tooltip including additional information related to the logical CPU division corresponding to the one of the multiple cells.

8. A computing device as recited in claim 7, the additional information comprising the identifier of the logical processor corresponding to the one of the multiple cells and an indication of whether the logical processor corresponding to the one of the multiple cells is parked.

9. A method comprising:

determining whether a computing device having multiple logical central processing unit (CPU) divisions has less than a threshold number of logical CPU divisions or has at least the threshold number of logical CPU divisions, each of the logical CPU divisions being associated with a logical processor identifier;

displaying, in response to determining that the computing device has less than the threshold number of logical CPU divisions, a logical CPU division management view for the computing device as a graph representation, the graph representation including one or more graphs, each of the one or more graphs identifying multiple usage values of a corresponding one of the multiple logical CPU divisions at corresponding multiple times, each usage value of each of the multiple logical CPU divisions being a processing capacity of the logical CPU division that is being used to execute processes on the computing device; and displaying, in response to determining that the computing device has at least the threshold number of logical CPU divisions, the logical CPU division management view for the computing device as a heat map representation, the heat map representation including multiple cells each corresponding to one of the multiple logical CPU divisions each of the multiple cells being displayed in one of multiple different manners based on a window size of a window that displays the heat map representation and a usage of the corresponding logical CPU division and the multiple cells arranged sequentially according to the logical processor identifier associated with each of the logical CPU divisions, the displaying the logical CPU division management view as a heat ma p representation including:

determining whether a window size of a window that displays the heat map representation is less than a threshold size or at least the threshold size;

displaying, in response to the determination that the window size is at least the threshold size, a numeric usage value identifying the usage of the corresponding logical CPU division in each of the multiple cells; and displaying, in response to the determination that the window size is less than the threshold size, a color intensity corresponding to a range of logical CPU division usage values in each of the multiple cells, without displaying a numeric usage value in each of the multiple cells.

10. A method as recited in claim 9, each logical CPU division comprising a logical processor.

11. A method as recited in claim 9, each logical CPU division comprising a Non-Uniform Memory Access (NUMA) node.

12. A method as recited in claim 9, the displaying the logical CPU division management view as a graph representation comprising displaying the logical CPU division management view as a graph representation at the computing device, and the displaying the logical CPU division management view as a heat map representation comprising displaying the logical CPU division management view as a heat map representation at the computing device.

13. A method as recited in claim 9, the color intensities in the multiple cells comprising different intensities of a same color.

14. A method as recited in claim 9, the color intensities in the multiple cells comprising color intensities for backgrounds of the multiple cells.

15. A method as recited in claim 9, the displaying the logical CPU division management view as a heat map representation further including displaying, in response to the determination that the window size is at least the threshold size, both the numeric usage value identifying the usage of the corresponding logical CPU division and the color intensity corresponding to the logical CPU division usage value in each of the multiple cells.

16. A method as recited in claim 9, the displaying the logical CPU division management view as a heat map representation further including displaying, in response to the determination that the window size is at least the threshold size, a kernel usage value identifying kernel usage of the corresponding one of the multiple logical CPU divisions in each of the multiple cells.

17. A method as recited in claim 9, the displaying the logical CPU division management view as a heat map representation further comprising:

displaying, if the corresponding one of the multiple logical CPU divisions is parked, an indication in the corresponding cell that the corresponding one of the multiple logical CPU divisions is parked.

18. A method as recited in claim 9, further comprising displaying a tooltip for one of the multiple cells, the tooltip including additional information related to the logical CPU division corresponding to the one of the multiple cells.

19. A method as recited in claim 18, the additional information comprising the identifier of the logical processor corresponding to the one of the multiple cells and an indication of whether the logical processor corresponding to the one of the multiple cells is parked.

20. A method as recited in claim 18, the additional information comprising an indication of a particular number of processes contributing to the usage of the logical CPU division corresponding to the one of the multiple cells.

* * * * *